(12) United States Patent
Sohn

(10) Patent No.: US 11,215,782 B2
(45) Date of Patent: Jan. 4, 2022

(54) FLEXURES FOR OPTICAL COMPONENTS

(71) Applicant: Facebook Technologies, LLC, Menlo Park, CA (US)

(72) Inventor: Alexander Sohn, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 136 days.

(21) Appl. No.: 16/570,632

(22) Filed: Sep. 13, 2019

(65) Prior Publication Data

US 2021/0080673 A1    Mar. 18, 2021

(51) Int. Cl.
*G02B 7/02*     (2021.01)
*G02B 7/00*     (2021.01)

(52) U.S. Cl.
CPC .................................. *G02B 7/003* (2013.01)

(58) Field of Classification Search
CPC .... G02B 7/003; G02B 13/0085; G02B 7/022; G02B 7/026; G02B 27/0093; G02B 27/0176; G02B 27/62; G02B 3/0068; G02B 7/021; G02B 3/0075; H04N 5/2254
USPC .......................................................... 359/819
See application file for complete search history.

(56) References Cited

U.S. PATENT DOCUMENTS

| 9,001,257 B1 | 4/2015 | Tang et al. |
| 2006/0140623 A1 | 6/2006 | Yu |
| 2009/0141375 A1 * | 6/2009 | Chang ........................ G02B 7/08 359/824 |
| 2014/0354856 A1 | 12/2014 | Zhou et al. |
| 2017/0003472 A1 | 1/2017 | Fu et al. |
| 2018/0067278 A1 | 3/2018 | Lipson et al. |

FOREIGN PATENT DOCUMENTS

| CN | 101377560 A | 3/2009 |
| JP | S6064316 A | 4/1985 |
| WO | 2014072818 A2 | 5/2014 |
| WO | 2015053626 A2 | 4/2015 |
| WO | 2015111703 A1 | 7/2015 |

OTHER PUBLICATIONS

International Searching Authority, Patent Cooperation Treaty, European Application No. PCT/US2020/047414, Notification Date: Oct. 28, 2020, 13 pages.
International Searching Authority, Patent Cooperation Treaty, European Application No. PCT/US2020?037084, Notification Date: Jun. 10, 2020, 10 pages.

* cited by examiner

*Primary Examiner* — James C. Jones
(74) *Attorney, Agent, or Firm* — Freestone Intellectual Property Law PLLC; Aaron J. Visbeek

(57) ABSTRACT

An example optical substrate, according to aspects of the present disclosure, includes a support structure, a plurality of optical components, and a plurality of flexures. Each flexure is engaged with the support structure and a respective optical component for allowing independent lateral movements of the optical components during assembly of the optical substrate with another layer of an optical assembly.

19 Claims, 5 Drawing Sheets

FLEXURES FOR OPTICAL COMPONENTS

FIELD OF DISCLOSURE

Aspects of the present disclosure relate generally to flexures for optical components of an optical substrate.

BACKGROUND

A head mounted display (HMD) is a display device, typically worn on the head of a user. HMDs may be used in a variety of applications, such as gaming, aviation, engineering, medicine, entertainment and so on to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

The accuracy of the various optical elements included in the HMD, such as lenses, polarizers, waveplates, etc. may be dependent on the particular application. For example, some HMDs may incorporate an eye-tracking system that includes an integrated camera to track a user's eye movements. Thus, as the requirements and accuracy for the eye-tracking system increases, the accuracy required in the manufacturing and assembly of the various optical elements used by the eye-tracking system also increases.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to flexures for optical components of an optical substrate. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

Figure 1:
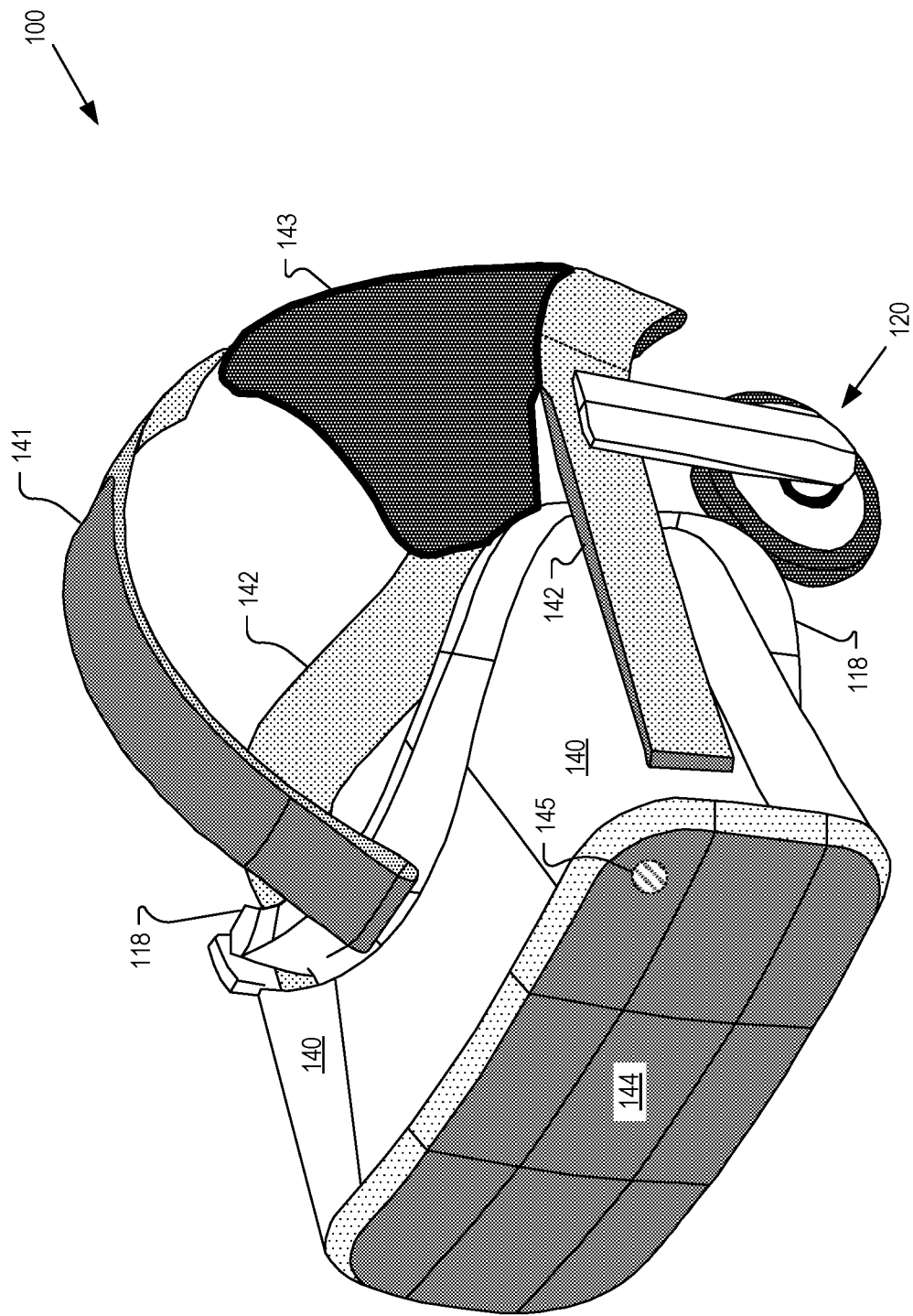
FIG. 1 illustrates a head mounted display (HMD), in accordance with aspects of the present disclosure.

FIG. 1 illustrates an HMD 100, in accordance with aspects of the present disclosure. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

Viewing structure 140 may include a display system having one or more electronic displays for directing light to the eye(s) of a user of HMD 100. The display system may include one or more of an LCD, an organic light emitting diode (OLED) display, or micro-LED display for emitting light (e.g., content, images, video, etc.) to a user of HMD 100.

In some examples, an electronic optical component 145 may be included in viewing structure 140. In some aspects, the electronic optical component 145 is a camera or image sensor for capturing image(s) of an eye of a user of HMD 100 for eye-tracking operations. In other aspects, the electronic optical component 145 is a Simultaneous Localization and Mapping (SLAM) sensor, such as an optical sensor, rangefinder, LiDAR sensor, sonar sensor, etc., for mapping the user and/or environment surrounding the HMD 100. In other examples, electronic optical component 145 may be a laser or other light-emitting device.

In some aspects, the electronic optical component 145 may include one or more small-diameter optical components, such as a lens, a polarizer, a waveguide, reflector, a waveplate, etc. In some aspects, a "small-diameter" optical component refers to an optical component having a diameter (e.g., aperture) that is 3 millimeters or less. As mentioned above, as the requirements and accuracy for the various systems (e.g., eye-tracking system or SLAM system) of an HMD increases, so too does the accuracy required in the manufacturing and assembly of the various small-diameter optical components.

Conventional optical component assembly techniques include forming large numbers of optical components on a sheet and then assembling multiple layers of these sheets to simultaneously produce several optical assemblies, of which, each may be separated and incorporated into a respective electronic optical component, such as electronic optical component 145. Typically, the assembly of one layer of optical components with another layer of optical components involves an alignment process to ensure that each of the optical components in one layer are correctly aligned with a respective optical component on the other layer (e.g., a lens-to-lens alignment).

Some conventional alignment processes between layers during assembly are typically performed by way of an active alignment system that utilizes one or more vision systems. However, for small-diameter optical components it is difficult to achieve the desired alignment across the entire sheet of optical components. For example, each optical component may be formed at a location on a respective layer within a certain manufacturing tolerance. However, the tolerances for each optical component may compound across the sheet, such that, during assembly with another layer, optical components in one area of the sheet are within the desired alignment, whereas other optical components in another area of the sheet are not within the desired alignment.

Accordingly, aspects of the present disclosure provide an optical substrate that includes optical components secured to a support structure by way of flexures that allow independent lateral movements of each optical component during assembly with another layer. As will be described in more detail below, in some embodiments, each optical component may include an alignment feature that, together with the lateral movements provided by the flexures, allows each optical component to self-align with a respective optical component of another layer during the assembly process.

Figure 2:
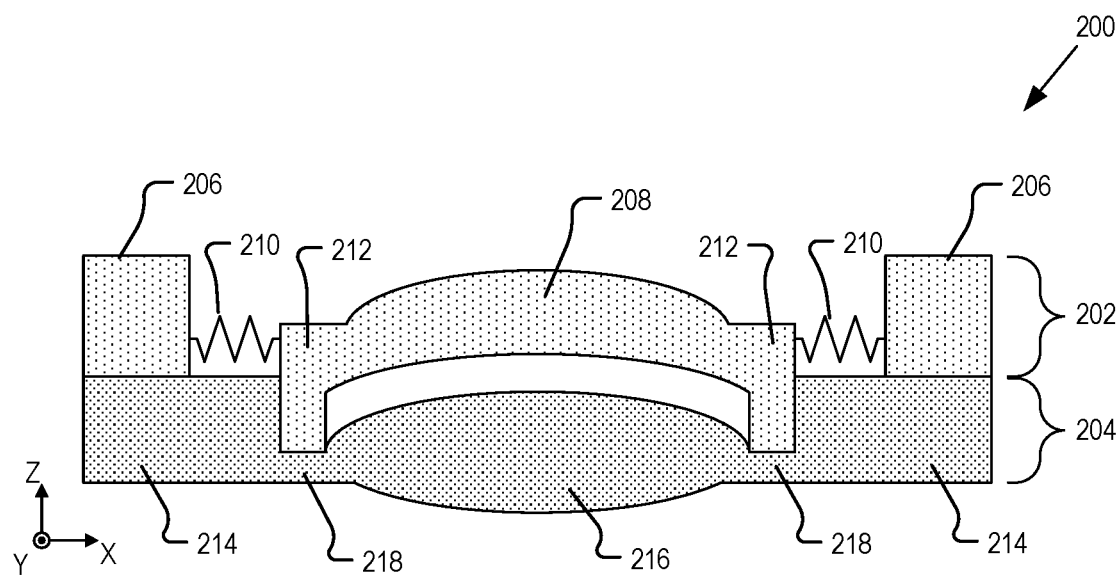
FIGS. 2-5 are cross-sectional views of example optical assemblies, in accordance with aspects of the present disclosure.

FIG. 2 illustrates an example optical assembly 200, in accordance with aspects of the present disclosure. Optical assembly 200 is one possible optical assembly for use with the electronic optical component 145 of FIG. 1. The illustrated example of optical assembly 200 is shown as including an optical substrate 202 and another layer 204. Optical substrate 202 is shown as including a support structure 206, an optical component 208, a flexure 210, and an alignment feature 212. Layer 204 is shown as including a support structure 214, an optical component 216, and a flange 218.

In some examples, the support structure 206, the optical component 208, the flexure 210, and the alignment feature 212, together, are a single monolithic structure. The optical substrate 202 may be formed from an optically transmissive material such as plastic, glass, poly-methyl methacrylate (PMMA), or other acrylic. In some examples, the optical substrate 202 may be machined to form the optical surface of the optical component 208. The machining of the optical substrate 202 may also include simultaneously forming the flexure 210 as well as the alignment feature 212. Thus, in some examples, the flexure 210 and the alignment feature 212 are formed from the same optical material as that of the optical component 208. In some aspects, the machining of the optical substrate 202 to form the optical component 208, the flexure 210, and the alignment feature 212 is done by way of fast tool servo diamond turning or multi-axis diamond milling.

In other examples, optical substrate 202 is formed by way of a mold that includes a shape that defines the optical component 208, the flexure 210, as well as the alignment feature 212. That is, a liquid optical material may be provided (poured or injected) into the mold to simultaneously form the optical component 208, the flexure 210, and the alignment feature 212. In some embodiments, the liquid optical material is then cured to a solid state.

In some examples, optical component 208 generally has a circular shape. However, in other examples, optical component 208 may be any of a variety of shapes, such as rectangular, oblong, square, oval, etc., in accordance with the aspects provided herein.

The optical component 208 may be one or more of a lens, a mirror, a diffuser, a filter, a polarizer, a prism, a window, a beam splitter, a diffractive element, or the like. In some examples, optical component 208 is configured to receive light and to direct/pass the light to a corresponding electronic component (e.g., a camera and/or image sensor). In other examples, optical component 208 is configured to receive light generated by the corresponding electronic component (e.g., a laser) and to direct/pass the light into the environment.

FIG. 2 also illustrates the optical substrate 202 as including at least one flexure 210. As shown in FIG. 2, flexure 210 is disposed between the optical component 208 and the support structure 206 for flexibly securing the optical component 208 to the support structure 206. For example, flexure 210 is shown as being engaged with (i.e., coupled to) the support structure 206 and the optical component 208 to allow lateral movements of the optical component 208 during assembly of the optical substrate 202 with the layer 204. In some aspects, lateral movements of the optical component 208 may include movements along the X-Y plane. In some examples, flexure 210 is configured to undergo deformation in the flexure itself to provide movement of the optical component 208 during mating of the optical substrate 202 with the layer 204. For example, flexure 210 may compress on one side of the optical component 208 along the x-axis, while expanding on the other side of the optical component 208 to allow movement of the optical component 208 along the x-axis. In some examples, flexure 210 is a continuous structure that surrounds a periphery of the optical component 208. In other examples, flexure 210 may be segmented and may only be present for portions of the periphery of optical component 208.

In some aspects, flexure 210 is configured as a spring, where a thickness, length, or other aspect of the flexure 210 is configured to control the amount of lateral movement possible by the optical component 208 and/or the amount of force required for the lateral movements during assembly.

FIG. 2 also illustrates optical component 208 as including an alignment feature 212. In some examples, alignment feature 212 is a continuous structure that surrounds a periphery of the optical component 208. In other examples, alignment feature 212 may be segmented and may only be present for portions of the periphery of optical component 208.

In some aspects, the alignment feature 212 is included in the optical component 208 to mate with a corresponding alignment feature of an optical component of another layer. By way of example, FIG. 2 illustrates alignment feature 212 contacting with the flange 218 of layer 204. FIG. 2 illustrates alignment feature 212 configured as a bump that extends outwardly (e.g., protrudes). In this example, the corresponding alignment feature provided by flange 218 is configured as a groove that mates with (i.e., contacts) the bump to form a coupling between optical components 208 and 216. In other examples, alignment feature 212 is configured as a groove that extends inwardly, where the corresponding alignment feature of optical component 216 is configured as a bump that mates with the groove to form the coupling.

In some aspects, the lateral movements allowed by flexure 210 along with the alignment feature 212 are configured to provide for optical alignment of the optical component 208 with the optical component 216 during assembly of the optical substrate 202 with layer 204. In one example, optical alignment of the optical components 208 and 216 refers to an optical center of optical component 208 being on the same axis as an optical center of optical component 216.

With regards to layer 204, this layer is shown as including a support structure 214, optical component 216, and at least one flange 218. In some examples, layer 204 is fabricated separately from the optical substrate 202 and subsequently assembled with optical substrate 202 to form optical assembly 200. As shown in FIG. 2, the flange 218 is disposed between the support structure 214 and the optical component 216. In some aspects, flange 218 is configured to maintain a stationary position of the optical component 216 with respect to the support structure 214 during assembly of the optical substrate 202 to layer 204. That is, flange 218 may be configured to restrict (e.g., prevent) lateral movements of the optical component 216 along the x-y plane during assembly to allow self-alignment by way of lateral movements of optical component 208 provided by flexure 210 and alignment feature 212.

In some examples, the support structure 214, the optical component 216, and the flange 218, together, are a single monolithic structure. The layer 204 may be formed from an optically transmissive material such as plastic, glass, polymethyl methacrylate (PMMA), or other acrylic. In some examples, the layer 204 may be machined to form the optical surface of the optical component 216. The machining of the layer 204 may also include simultaneously forming the flange 218. Thus, in some examples, the flange 218 and the optical component 216 are formed from the same optical material. In some aspects, the machining of the layer 204 to form the optical component 216 and the flange 218 is done by way of fast tool servo diamond turning or multi-axis diamond milling.

In other examples, layer 204 is formed by way of a mold that includes a shape that defines the optical component 216 and the flange 218. That is, a liquid optical material may be provided (poured or injected) into the mold to simultaneously form the optical component 216 and the flange 218. In some embodiments, the liquid optical material is then cured to a solid state.

The optical component 216 may be one or more of a lens, a mirror, a diffuser, a filter, a polarizer, a prism, a window, a beam splitter, a diffractive element, or the like. In some examples, optical component 216 is configured to receive light and to direct/pass the light to a corresponding electronic component (e.g., a camera and/or image sensor). In other examples, optical component 216 is configured to receive light generated by the corresponding electronic component (e.g., a laser) and to direct/pass the light into the environment.

Figure 3:
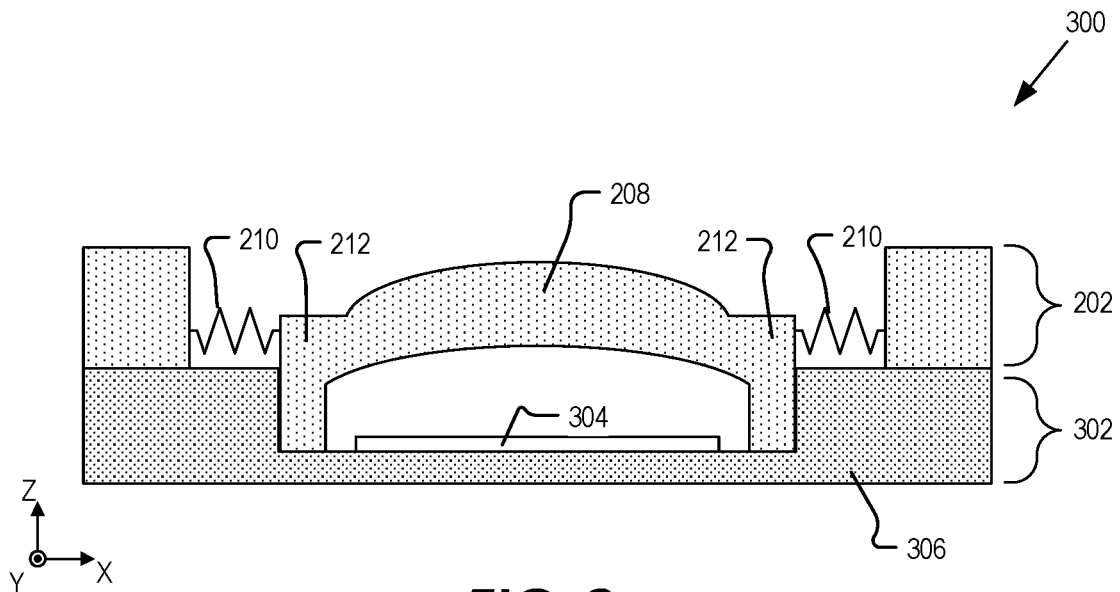

The example of FIG. 2 illustrates optical components 208 and 216 as passive optical components (e.g., lenses). However, in other examples, one or more of the optical components 208/216 may be an active optical component, such as an image sensor or light-emitting device (e.g., a laser). For example, FIG. 3 illustrates an optical assembly 300 that includes optical substrate 202 coupled to a layer 302, where layer 302 includes an active optical component 304 disposed on a substrate 306 (e.g., a printed circuit board, a semiconductor substrate, etc.) Active optical component 304 may be camera, an image sensor, an optical sensor, a rangefinder, a LiDAR sensor, a sonar sensor, and/or a light-emitting device, such as a laser.

In the illustrated embodiment of FIG. 3, the lateral movements allowed by flexure 210 along with the alignment feature 212 are configured to provide for optical alignment of the optical component 208 with the active optical component 304 during assembly of the optical substrate 202 with layer 302.

In some implementations, the alignment features included in the optical substrate are configured to contact a corresponding set of alignment features included in another optical component to provide a kinematic coupling between the optical components and to provide further precision in their optical alignment. In some aspects, the kinematic coupling is designed to provide a reproducible and precise coupling between the optical components. The design of the kinematic coupling may conform to the principles of "exact constraint design". In some examples, the kinematic coupling eliminates over constraint of the optical elements within a housing and may also be insensitive to thermal expansion. That is, as the housing and/or optical components themselves expand or contract due to thermal variances, the kinematic coupling may maintain a constant centration of the optical components. In some aspects, the kinematic couplings, as provided herein, may allow for sub-micron alignment of the optical components.

Figure 4:
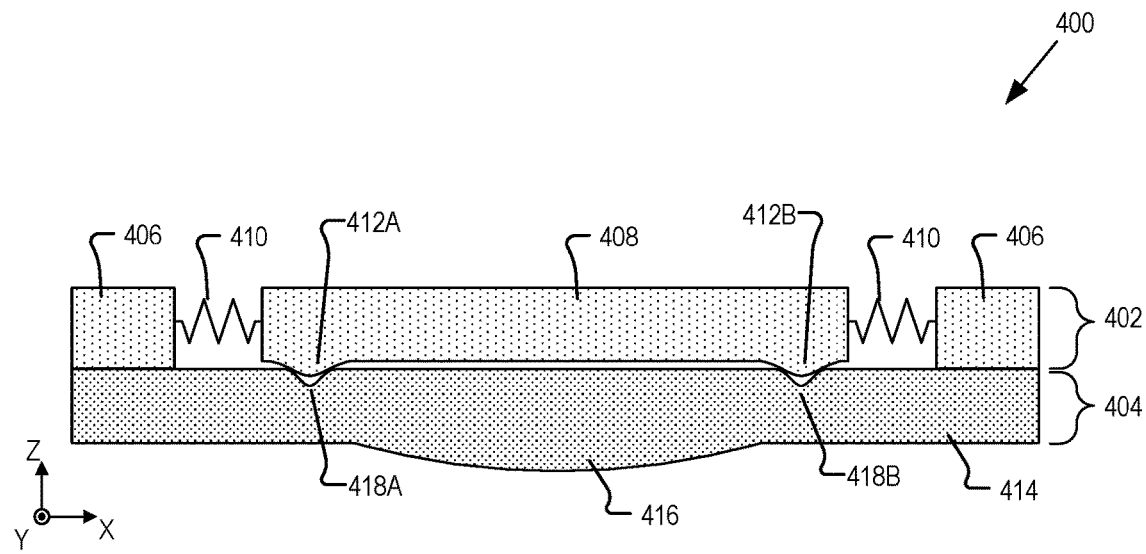

By way of example, FIG. 4 illustrates an optical assembly 400 that includes an optical substrate 402 mated with a layer 404. Optical assembly 400 is one possible example of an optical assembly included in the electronic optical component 145 of FIG. 1. The illustrated example of optical substrate 402 is shown as including a support structure 406, an optical component 408, a flexure 410, and alignment features 412A and 412B. The illustrated example of layer 404 is shown as including a support structure 414, an optical component 416, and alignment features 418A and 418B.

In some examples, the kinematic coupling provided by alignment features 412A, 412B, 418A, and 418B eliminates overconstraint of the optical components 408 and 416 when placed within a housing (not shown in FIG. 4). In addition, the kinematic coupling provides for optical alignment of the optical component 408 with the optical component 416. As mentioned above, the kinematic coupling between optical component 408 and optical component 416 may maintain alignment even in response to thermal expansion/contraction of the optical components and/or housing.

In some examples, each of the alignment features 412A, 412B, 418A, and 418B have a physical geometry that aides in the formation of the kinematic coupling between optical component 408 and the optical component 416. For example, in one aspect, each of the alignment features 412A, 412B, 418A, and 418B may include a curved cross-section. In some aspects, the curved cross-section is a sinusoidal shape.

As shown in FIG. 4, the alignment feature 412A (configured as a bump) is included on a surface of optical substrate 402, whereas a corresponding alignment feature 418A (configured as a groove) is included on a surface of layer 404. Similarly, the alignment feature 412B (configured as a bump) is configured to mate with corresponding alignment feature 418B of layer 404. In some aspects, the alignment features 412A and 412B are configured to physically contact the corresponding alignment features 418A and 418B at a region of maximum slope of the sinusoidal shape.

In some examples, the sinusoidal shapes of the alignment features 418A and/or 418B are based on a cosine function. By way of example, the sinusoidal shape of alignment feature 418A may be based on:

$$y = A_g \cos(\pi T_g x), \qquad [\text{EQ.1}]$$

where $A_g$ is the amplitude and $T_g$ is the period of the function that dictates the sinusoidal shape of an alignment feature configured as a groove. Similarly, the sinusoidal shape of alignment feature 412A may be based on:

$$y = A_b \cos(\pi T_b x), \qquad [\text{EQ.2}]$$

where $A_b$ is the amplitude and $T_b$ is the period of the function that dictates the sinusoidal shape of an alignment feature configured as a bump. In the illustrated example, the curved shape of the cross-section of alignment feature 412A is different from the curved shape of the cross-section of corresponding alignment feature 418A. In some examples, the shape of the cross-sections of corresponding alignment features is different such that, when assembled, the corresponding alignment features only make physical contact at certain regions of the alignment feature (e.g., at a region of maximum slope of the sinusoidal shape). Thus, in some aspects, the cosine function (e.g., EQ. 1) that dictates the shape of alignment feature 418A is different from the cosine function (e.g., EQ. 2) that dictates the shape of alignment feature 412A. In some examples, the amplitude of EQ. 1 is different from the amplitude of EQ. 2 (i.e., $A_g \neq A_b$). In other examples, the period of EQ. 1 is different from period of EQ. 2 (i.e., $T_g \neq T_b$). In yet another example, both amplitude and period of EQ. 1 are different from the corresponding amplitude and period of EQ. 2.

Although FIG. 4 illustrates an optical assembly 400 that includes two optical components 408 and 416, optical assemblies as provided herein may include any number of optical components including two or more. For example, FIG. 5 illustrates an optical assembly 500 that includes three optical components 510, 518, and 528.

Optical assembly 500 is one possible example of an optical assembly for use with electronic optical component 145 of FIG. 1. The illustrated example of optical assembly 500 is shown in FIG. 5 as including a first layer 502, an optical substrate 504, and a second layer 506. The first layer 502 is illustrated as including a support structure 508, a first optical component 510, a flexure 512, and alignment features 514A and 514B. The optical substrate 504 is shown as including a support structure 516, a second optical component 518, flexure 520, alignment features 522A and 522B, and alignment features 524A and 524B. The second layer 506 is shown as including a support structure 526, a third optical component 528, and alignment features 530A and 530B.

Figure 5:
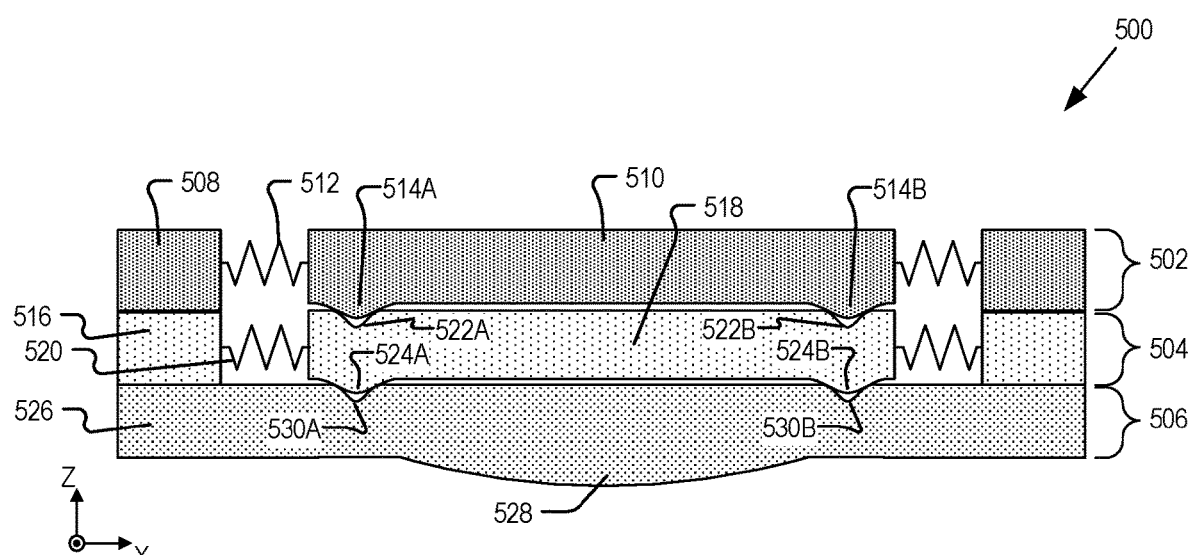

As shown in FIG. 5, the alignment feature 514A of the first optical component 510 is configured to physically contact with corresponding alignment feature 522A of the second optical component 518. Similarly, alignment feature 514B is configured to physically contact with corresponding alignment feature 522B. The alignment features 514A, 514B, 522A, and 522B are configured to provide a kinematic coupling between the first optical component 510 and the second optical component 518 to optically align their respective optical components.

FIG. 5 further shows an alignment feature 524A of the second optical component 518 that is configured to physically contact with corresponding alignment feature 530A of the third optical component 528. Similarly, alignment feature 524B is configured to physically contact with corresponding alignment feature 530B. The alignment features 524A, 524B, 530A, and 530B are configured to provide a kinematic coupling between the second optical component 518 and the third optical component 528 to optically align their respective optical components.

Accordingly, fabrication of optical assembly 500 may include providing the second layer 506, where the position of optical component 528 is stationary with respect to the support structure 526 (i.e., lateral movements of optical component 528 are restricted/prevented along the x-y axis). Next, optical substrate 504 may be positioned over the second layer 506, where the flexure 520 allows lateral movements of the optical component 518 to provide contact between the alignment features 524A, 524B, 530A, and 530B for the optical alignment of optical component 518 to optical component 528. Next, the first layer 502 is positioned over the optical substrate, where flexure 512 allows lateral movements of the optical component 510 to provide contact between alignment features 514A, 514B, 522A, and 522B for the optical alignment of optical component 510 to optical component 518.

Figure 6:
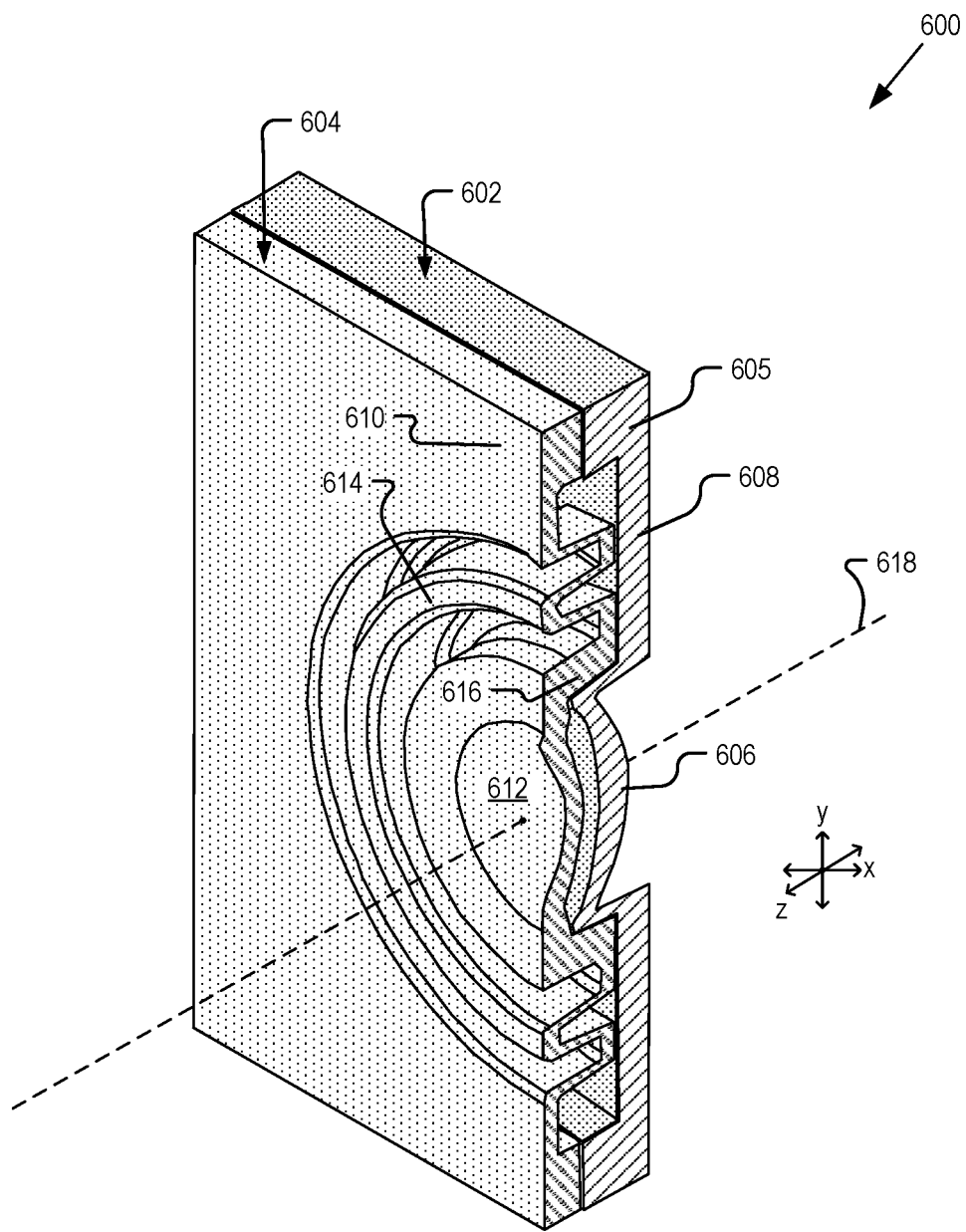
FIG. 6 is a perspective view of an example optical assembly, in accordance with aspects of the present disclosure.

FIG. 6 is a perspective view of an example optical assembly 600, in accordance with aspects of the present disclosure. Optical assembly 600 is one possible implementation of any of the optical assemblies discussed herein, including the optical assembly included in electronic optical component 145 of FIG. 1, optical assembly 200 of FIG. 2, and/or optical assembly 300 of FIG. 3. As shown in FIG. 6, optical assembly 600 includes a first layer 602 and an optical substrate 604. The illustrated example of first layer 602 is shown as including a support structure 605, an optical component 606, and a flange 608. The optical substrate 604 is shown as including a support structure 610, an optical component 612, a flexure 614, and an alignment feature 616. In some examples, the support structure 605, the optical component 606, and flange 608 correspond to elements 214, 216, and 218, respectively of FIG. 2. Similarly, the support structure 610, optical component 612, flexure 614, and alignment feature 616 correspond to elements 206, 208, 210, and 212, respectively of FIG. 2.

As shown in FIG. 6, flexure 614 is configured as a continuous structure that surrounds the entire periphery of optical component 612. The flexure 614 is configured to allow lateral movements of the optical component 612 (i.e., along the x-y plane) during assembly of the optical substrate 604 with the first layer 602, where a final position of the optical component 612 is controlled via the alignment feature 616. In some examples, one or more of the optical component 612, the flexure 614, or the alignment feature 616 are rotationally symmetric about axis 618 (e.g., an optical center of optical component 612).

As mentioned above, optical component assembly techniques may include forming large numbers of optical components on a sheet and then assembling multiple layers of these sheets to simultaneously produce several optical assemblies. The optical assemblies may then be separated (e.g., cut) from one another and then incorporated into an optical system such as electronic optical component 145 of FIG. 1. In some implementations, the optical components of one sheet may need to be optically aligned with the optical components of another sheet during assembly. Accordingly, aspects of the present disclosure provide an optical substrate that includes flexures for allowing independent lateral movements of each optical component during assembly with another layer. Together with the aforementioned alignment features, aspects of the present disclosure may allow for the assembly of an optical substrate with another layer such that each optical component may self-align.

Figure 7:
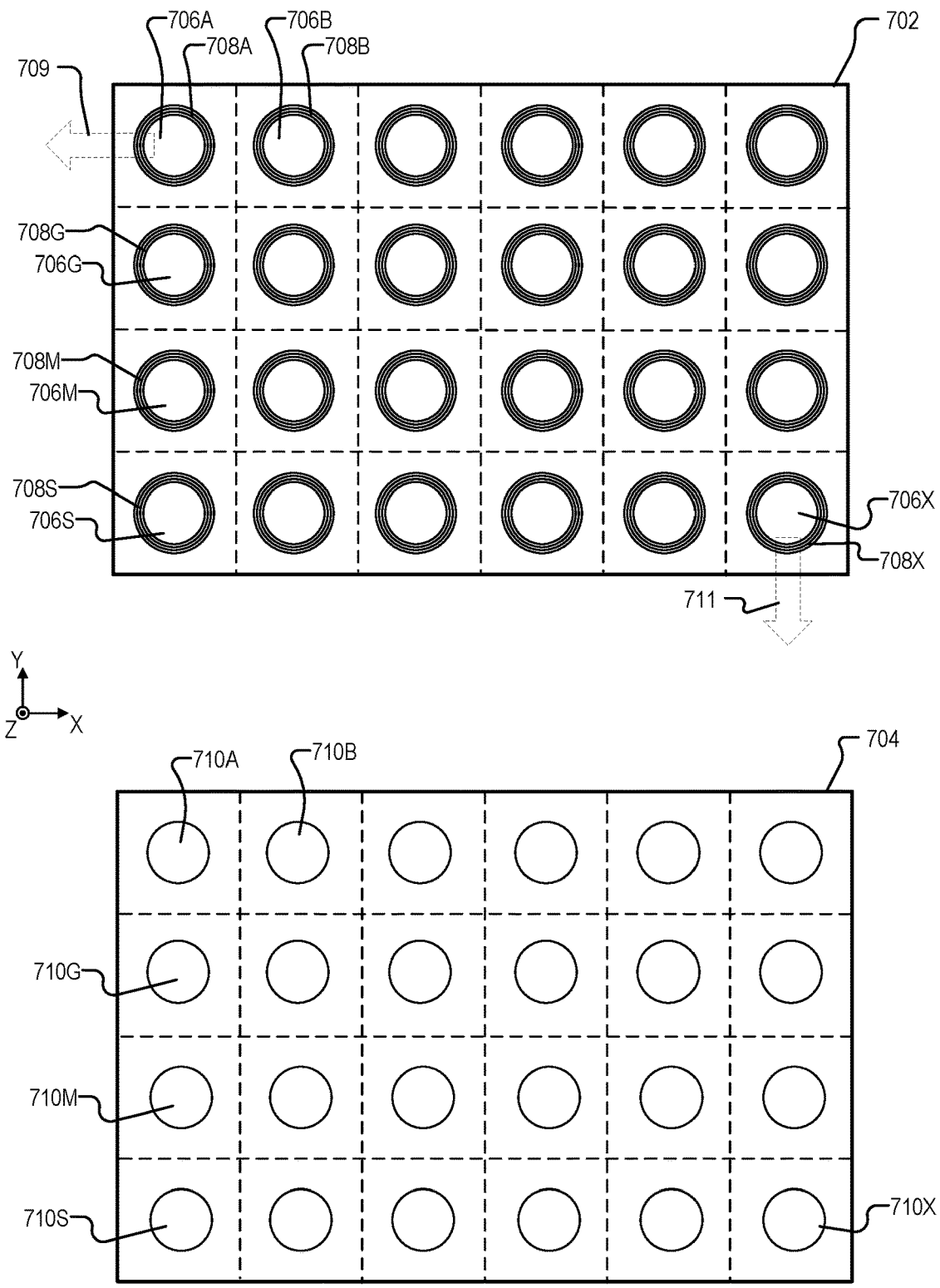
FIG. 7 is a plan view of an example optical substrate and a corresponding additional layer of an optical assembly, in accordance with aspects of the present disclosure.

By way of example, FIG. 7 is a plan view of an example optical substrate 702 and a corresponding additional layer 704 of an optical assembly (prior to assembly). Optical substrate 702 is shown as including a plurality of optical components 706A-706X and a plurality of flexures 708A-708X. Optical substrate 702 may also include support structures as well as a plurality of alignment features (not explicitly shown in FIG. 7). The structure of one or more of the optical components 706A-706X and the flexures 708A-708X may be implemented by way of any of the structures discussed herein, such as those described with reference to the optical substrate 202 of FIGS. 2 and 3, the optical substrate 402 of FIG. 5, the first layer 502 of FIG. 5, the optical substrate 504 of FIG. 5, and/or the optical substrate 604 of FIG. 6. Thus, in some examples, each of the optical components 706A-706X and corresponding flexures 708A-708X provide a single monolithic structure formed from the same optically transmissive material. As discussed above, optical substrate 702 may be formed by machining the optically transmissive material to simultaneously form the optical components 706A-706X and the flexures 708A-708X. Alternatively, the optical substrate 702 may be formed via a molding process to simultaneously form the optical components 706A-706X and the flexures 708A-708X.

The additional layer 704 is shown as including a plurality of optical components 710A-710X. The structure of one or more of the optical components 710A-710X may be implemented by way of any of the structures discussed herein, including the layer 204 of FIG. 2, where the optical components 710A-710X are passive optical components, or the layer 302 of FIG. 3, where the optical components 710A-710X are active optical components. The optical components 710A-710X may also be implemented as the layer 404 of FIG. 4, the second layer 506 of FIG. 5, and/or the first layer 602 of FIG. 6. Thus, in some examples, the optical components 710A-710X, together, provide a single monolithic structure formed from the same material, where each of the optical components 710A-710X are configured to maintain a stationary position during assembly.

In some implementations, mating the optical substrate 702 to the additional layer 704 includes positioning the optical substrate 702 over the additional layer 704. The optical substrate 702 is then lowered onto the additional layer 704, where each optical component 706A-706X self-aligns with their respective optical component 710A-710X of the additional layer 704. That is, the flexures 708A-708X may allow for independent lateral movements of each of the optical components 706A-706X during the assembly process. Due to the independent nature of the lateral movements, lateral movement provided by one flexure may be different from the lateral movement provided by another flexure. For example, FIG. 7 illustrates a first lateral movement 709 of optical component 706A, provided by flexure 708A, to optically align optical component 706A with optical component 710A during the assembly process. FIG. 7 also illustrates a second lateral movement 711 of optical component 706X, provided by flexure 708X, to optically align optical component 706X with optical component 710X. As shown in FIG. 7, the first lateral movement 709 is in a different direction as that of the second lateral movement 711 (i.e., first lateral movement 709 is along the x-axis, whereas the second lateral movement 711 is along the y-axis). Thus, in some aspects, the flexures 708A-708X allow for independent lateral movements of differing directions. In addition, the flexures 708A-708X may allow for the magnitude of their respective lateral movements to differ (e.g., optical component 706A may laterally move a first distance that is different from the distance of a lateral movement of the optical component 706X).

The functionality of one or more components described above with reference to FIGS. 1-7 may be implemented in various ways consistent with the teachings herein. In some designs, the functionality of these components may be implemented as one or more discrete optical components. In addition, the components and functions represented by FIGS. 1-7, as well as other components and functions described herein, may be implemented using any suitable means. Such means also may be implemented, at least in part, using corresponding structure as taught herein. For example, a means for receiving, generating, directing, and/or focusing light may correspond at least in some aspects to, for example, the optical component 208 of FIG. 2, the optical component 216 of FIG. 2, the optical component 304 of FIG. 3, the optical component 408 of FIG. 4, the optical component 416 of FIG. 4, the optical component 510 of FIG. 5, the optical component 518 of FIG. 5, the optical component 528 of FIG. 5, the optical component 612 of FIG. 6, the optical component 606 of FIG. 6, the optical components 706A-706X of FIG. 7, and/or the optical components 710A-710X. In addition, a means for flexibly securing an optical component to a support structure may correspond at least in some aspects to, for example, the flexure 210 of FIGS. 2 and 3, the flexure 410 of FIG. 4, the flexure 512 of FIG. 5, the flexure 520 of FIG. 5, the flexure 614 of FIG. 6, and/or the flexures 708A-708X of FIG. 7. Even still, a means for self-aligning an optical component may correspond at least in some aspects to, for example, the alignment feature 212 of FIGS. 2 and 3, alignment features 412A, 412B, 418A, and 418B of FIG. 4, alignment features 514A, 514B, 522A, 522B, 524A, 524B, 530A, and 530B of FIG. 5, and/or the alignment feature 616 of FIG. 6. Thus, in some aspects one or more of such means may be implemented using one or more optical components, layers, mediums, or other suitable structure as taught herein.

Embodiments of the invention may include or be implemented in conjunction with the manufacture of an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical substrate, comprising:
a support structure;
a plurality of optical components; and a plurality of flexures, wherein each flexure is engaged with the support structure and a respective optical component for allowing independent lateral movements of the optical components during assembly of the optical substrate with another layer of an optical assembly, and wherein each optical component comprises at least one alignment feature for optically aligning the optical component via the lateral movements during the assembly, wherein the at least one alignment feature of the optical component comprises one of a bump or groove formed on the optical substrate, and wherein a corresponding alignment feature of the other layer comprises the other of the bump or groove.

2. The optical substrate of claim 1, wherein optically aligning the optical component comprises optically aligning the optical component with another optical component of the other layer.

3. The optical substrate of claim 2, wherein the plurality of optical components of the optical substrate comprise at least one of: a lens, a mirror, a diffuser, a filter, a polarizer, a prism, a window, a beam splitter, or a diffraction grating.

4. The optical substrate of claim 3, wherein the other optical component of the other layer comprises at least one of: a lens, a mirror, a diffuser, a filter, a polarizer, a prism, a window, a beam splitter, or a diffraction grating.

5. The optical substrate of claim 3, wherein the other optical component of the other layer comprises at least one of: an image sensor, an optical sensor, a rangefinder, a LiDAR sensor, a Simultaneous Localization and Mapping (SLAM) sensor, a laser, or a light-emitting device.

6. The optical substrate of claim 1, wherein the at least one alignment feature of the optical component comprises a curved or sinusoidally-shaped cross-section.

7. The optical substrate of claim 1, wherein the support structure, the plurality of optical components, and the plurality of flexures comprise a single monolithic structure of optically transmissive material.

8. The optical substrate of claim 1, wherein a first lateral movement provided by a first flexure of the plurality of flexures during the assembly is different from a second lateral movement provided by a second flexure of the plurality of flexures.

9. The optical substrate of claim 8, wherein the first lateral movement is different from the second lateral movement in at least one of magnitude or direction.

10. An optical substrate, comprising:
a support structure;
a plurality of optical components; and
means for flexibly securing each optical component to the support structure, wherein the means are configured to allow independent lateral movements of the optical components during assembly of the optical substrate with another layer of an optical assembly, and wherein each optical component comprises at least one alignment feature for optically aligning the optical component via the lateral movements during the assembly, wherein the at least one alignment feature of the optical component comprises one of a bump or groove formed on the optical substrate, and wherein a corresponding alignment feature of the other layer comprises the other of the bump or groove.

11. The optical substrate of claim 10, wherein the plurality of optical components of the optical substrate comprise at least one of: a lens, a mirror, a diffuser, a filter, a polarizer, a prism, a window, a beam splitter, or a diffraction grating.

12. The optical substrate of claim 10, wherein support structure, the plurality of optical components, and the means for flexibly securing each optical component comprise a single monolithic structure of optically transmissive material.

13. An optical substrate, comprising:
a support structure;
a plurality of optical components; and
a plurality of flexures, wherein each flexure is engaged with the support structure and a respective optical component for allowing independent lateral movements of the optical components during assembly of the optical substrate with another layer of an optical assembly, and wherein a first lateral movement provided by a first flexure of the plurality of flexures during the assembly is different from a second lateral movement provided by a second flexure of the plurality of flexures.

14. The optical substrate of claim 13, wherein the first lateral movement is different from the second lateral movement in at least one of magnitude or direction.

15. The optical substrate of claim 13, wherein each optical component comprises at least one alignment feature for optically aligning the optical component via the lateral movements during the assembly.

16. The optical substrate of claim 15, wherein optically aligning the optical component comprises optically aligning the optical component with another optical component of the other layer.

17. The optical substrate of claim 16, wherein the plurality of optical components of the optical substrate comprise at least one of: a lens, a mirror, a diffuser, a filter, a polarizer, a prism, a window, a beam splitter, or a diffraction grating.

18. The optical substrate of claim 17, wherein the other optical component of the other layer comprises at least one of: a lens, a mirror, a diffuser, a filter, a polarizer, a prism, a window, a beam splitter, or a diffraction grating.

19. The optical substrate of claim 17, wherein the other optical component of the other layer comprises at least one of: an image sensor, an optical sensor, a rangefinder, a LiDAR sensor, a Simultaneous Localization and Mapping (SLAM) sensor, a laser, or a light-emitting device.

* * * * *